(12) United States Patent  (10) Patent No.: US 7,777,751 B2
Pearson  (45) Date of Patent: Aug. 17, 2010

(54) TILED MEMORY ARRAY FOR FULL SEARCH MOTION ESTIMATION

(75) Inventor: Eric C. Pearson, Conestogo (CA)

(73) Assignee: LSI Corporation, Milpitas, CA (US)

( * ) Notice: Subject to any disclaimer, the term of this patent is extended or adjusted under 35 U.S.C. 154(b) by 666 days.

(21) Appl. No.: 11/604,597

(22) Filed: Nov. 27, 2006

(65) Prior Publication Data

US 2008/0123744 A1    May 29, 2008

(51) Int. Cl.
*G09G 5/39* (2006.01)

(52) U.S. Cl. .................. 345/531; 345/530; 345/682

(58) Field of Classification Search ............... None
See application file for complete search history.

(56) References Cited

U.S. PATENT DOCUMENTS

| | | | | |
|---|---|---|---|---|
| 4,646,352 A | * | 2/1987 | Asai et al. | 382/125 |
| 5,644,689 A | * | 7/1997 | Ban et al. | 345/424 |
| 5,703,650 A | * | 12/1997 | Robinson | 348/413.1 |
| 5,706,025 A | * | 1/1998 | Kerman | 345/682 |
| 5,717,394 A | * | 2/1998 | Schwartz et al. | 341/51 |
| 5,973,742 A | * | 10/1999 | Gardyne et al. | 375/240.15 |
| 6,434,270 B1 | * | 8/2002 | Ohara et al. | 382/178 |
| 7,072,399 B2 | | 7/2006 | Winger et al. | 375/240.16 |
| 2003/0231176 A1 | * | 12/2003 | Oka et al. | 345/419 |
| 2004/0190614 A1 | * | 9/2004 | Schlockermann et al. | 375/240.12 |
| 2005/0190609 A1 | * | 9/2005 | Janssen et al. | 365/189.05 |
| 2007/0098073 A1 | * | 5/2007 | Maeda | 375/240.16 |

OTHER PUBLICATIONS

U.S. Appl. No. 10/669,930, filed Sep. 24, 2003, Gallant et al., "Multi-Standard Variable Block Size Motion Estimation Processor".
U.S. Appl. No. 10/682,631, filed Oct. 9, 2003, Pearson et al., "Supporting Motion Vectors Outside Picture Boundaries in Motion Estimation Process".
U.S. Appl. No. 10/714,712, filed Nov. 17, 2003, Gallant et al., "High Quality, Low Memory Bandwidth Motion Estimation Processor".

\* cited by examiner

*Primary Examiner*—Kee M Tung
*Assistant Examiner*—Jwalant Amin
(74) *Attorney, Agent, or Firm*—Christopher P. Maiorana, PC (57) ABSTRACT

A plurality of memory circuits and a logic circuit. The plurality of memory circuits may be configured to store a plurality of pixels. The pixels may be used in a motion estimation stage of a video encoder. The logic circuit may be configured to (i) control which of the pixels are stored in which of the plurality of memory banks and (ii) control accessing of the plurality of pixels.

15 Claims, 8 Drawing Sheets

Pixel (x,y) Storage Tiled over 16 RAMs

| ADDRESS | RAM 0 | RAM 1 | RAM 2 | .... | RAM 14 | RAM 15 |
|---|---|---|---|---|---|---|
| 0 | ( 0 , 0 ) | ( 1 , 0 ) | ( 2 , 0 ) | | ( 14 , 0 ) | ( 15 , 0 ) |
| 1 | ( 15 , 1 ) | ( 0 , 1 ) | ( 1 , 1 ) | | ( 13 , 1 ) | ( 14 , 1 ) |
| 2 | ( 14 , 2 ) | ( 15 , 2 ) | ( 0 , 2 ) | | ( 12 , 2 ) | ( 13 , 2 ) |
| 3 | ( 13 , 3 ) | ( 14 , 3 ) | ( 15 , 3 ) | | ( 11 , 3 ) | ( 12 , 3 ) |
| 4 | ( 12 , 4 ) | ( 13 , 4 ) | ( 14 , 4 ) | | ( 10 , 4 ) | ( 11 , 4 ) |
| 5 | ( 11 , 5 ) | ( 12 , 5 ) | ( 13 , 5 ) | | ( 9 , 5 ) | ( 10 , 5 ) |
| 6 | ( 10 , 6 ) | ( 11 , 6 ) | ( 12 , 6 ) | | ( 8 , 6 ) | ( 9 , 6 ) |
| 7 | ( 9 , 7 ) | ( 10 , 7 ) | ( 11 , 7 ) | | ( 7 , 7 ) | ( 8 , 7 ) |
| 8 | ( 8 , 8 ) | ( 9 , 8 ) | ( 10 , 8 ) | | ( 6 , 8 ) | ( 7 , 8 ) |
| 9 | ( 7 , 9 ) | ( 8 , 9 ) | ( 9 , 9 ) | | ( 5 , 9 ) | ( 6 , 9 ) |
| 10 | ( 6 , 10 ) | ( 7 , 10 ) | ( 8 , 10 ) | | ( 4 , 10 ) | ( 5 , 10 ) |
| 11 | ( 5 , 11 ) | ( 6 , 11 ) | ( 7 , 11 ) | | ( 3 , 11 ) | ( 4 , 11 ) |
| 12 | ( 4 , 12 ) | ( 5 , 12 ) | ( 6 , 12 ) | | ( 2 , 12 ) | ( 3 , 12 ) |
| 13 | ( 3 , 13 ) | ( 4 , 13 ) | ( 5 , 13 ) | .... | ( 1 , 13 ) | ( 2 , 13 ) |
| 14 | ( 2 , 14 ) | ( 3 , 14 ) | ( 4 , 14 ) | | ( 0 , 14 ) | ( 1 , 14 ) |
| 15 | ( 1 , 15 ) | ( 2 , 15 ) | ( 3 , 15 ) | | ( 15 , 15 ) | ( 0 , 15 ) |
| 16 | ( 0 , 16 ) | ( 1 , 16 ) | ( 2 , 16 ) | | ( 14 , 16 ) | ( 15 , 16 ) |
| 17 | ( 15 , 17 ) | ( 0 , 17 ) | ( 1 , 17 ) | | ( 13 , 17 ) | ( 14 , 17 ) |
| 18 | ( 14 , 18 ) | ( 15 , 18 ) | ( 0 , 18 ) | | ( 12 , 18 ) | ( 13 , 18 ) |
| 19 | ( 13 , 19 ) | ( 14 , 19 ) | ( 15 , 19 ) | | ( 11 , 19 ) | ( 12 , 19 ) |
| 20 | ( 12 , 20 ) | ( 13 , 20 ) | ( 14 , 20 ) | | ( 10 , 20 ) | ( 11 , 20 ) |
| 21 | ( 11 , 21 ) | ( 12 , 21 ) | ( 13 , 21 ) | | ( 9 , 21 ) | ( 10 , 21 ) |
| 22 | ( 10 , 22 ) | ( 11 , 22 ) | ( 12 , 22 ) | | ( 8 , 22 ) | ( 9 , 22 ) |
| 23 | ( 9 , 23 ) | ( 10 , 23 ) | ( 11 , 23 ) | | ( 7 , 23 ) | ( 8 , 23 ) |
| 24 | ( 16 , 0 ) | ( 17 , 0 ) | ( 18 , 0 ) | | | |
| 25 | | ( 16 , 1 ) | ( 17 , 1 ) | | ( 29 , 1 ) | |
| 26 | | | ( 16 , 2 ) | | ( 28 , 2 ) | ( 29 , 2 ) |
| 27 | ( 29 , 3 ) | | | | ( 27 , 3 ) | ( 28 , 3 ) |
| 28 | ( 28 , 4 ) | ( 29 , 4 ) | | | ( 26 , 4 ) | ( 27 , 4 ) |
| 29 | ( 27 , 5 ) | ( 28 , 5 ) | ( 29 , 5 ) | | ( 25 , 5 ) | ( 26 , 5 ) |
| 30 | ( 26 , 6 ) | ( 27 , 6 ) | ( 28 , 6 ) | | ( 24 , 6 ) | ( 25 , 6 ) |
| 31 | ( 25 , 7 ) | ( 26 , 7 ) | ( 27 , 7 ) | | ( 23 , 7 ) | ( 24 , 7 ) |
| 32 | ( 24 , 8 ) | ( 25 , 8 ) | ( 26 , 8 ) | | ( 22 , 8 ) | ( 23 , 8 ) |
| 33 | ( 23 , 9 ) | ( 24 , 9 ) | ( 25 , 9 ) | | ( 21 , 9 ) | ( 22 , 9 ) |
| 34 | ( 22 , 10 ) | ( 23 , 10 ) | ( 24 , 10 ) | | ( 20 , 10 ) | ( 21 , 10 ) |
| 35 | ( 21 , 11 ) | ( 22 , 11 ) | ( 23 , 11 ) | .... | ( 19 , 11 ) | ( 20 , 11 ) |
| 36 | ( 20 , 12 ) | ( 21 , 12 ) | ( 22 , 12 ) | | ( 18 , 12 ) | ( 19 , 12 ) |
| 37 | ( 19 , 13 ) | ( 20 , 13 ) | ( 21 , 13 ) | | ( 17 , 13 ) | ( 18 , 13 ) |
| 38 | ( 18 , 14 ) | ( 19 , 14 ) | ( 20 , 14 ) | | ( 16 , 14 ) | ( 17 , 14 ) |
| 39 | ( 17 , 15 ) | ( 18 , 15 ) | ( 19 , 15 ) | | | ( 16 , 15 ) |
| 40 | ( 16 , 16 ) | ( 17 , 16 ) | ( 18 , 16 ) | | | |
| 41 | | ( 16 , 17 ) | ( 17 , 17 ) | | ( 29 , 17 ) | |
| 42 | | | ( 16 , 18 ) | | ( 28 , 18 ) | ( 29 , 18 ) |
| 43 | ( 29 , 19 ) | | | | ( 27 , 19 ) | ( 28 , 19 ) |
| 44 | ( 28 , 20 ) | ( 29 , 20 ) | | | ( 26 , 20 ) | ( 27 , 20 ) |
| 45 | ( 27 , 21 ) | ( 28 , 21 ) | ( 29 , 21 ) | | ( 25 , 21 ) | ( 26 , 21 ) |
| 46 | ( 26 , 22 ) | ( 27 , 22 ) | ( 28 , 22 ) | | ( 24 , 22 ) | ( 25 , 22 ) |
| 47 | ( 25 , 23 ) | ( 26 , 23 ) | ( 27 , 23 ) | | ( 23 , 23 ) | ( 24 , 23 ) |

FIG. 9

TILED MEMORY ARRAY FOR FULL SEARCH MOTION ESTIMATION

FIELD OF THE INVENTION

The present invention relates to video processing generally and, more particularly, to a method and/or apparatus for implementing a tiled memory array for full search motion estimation.

BACKGROUND OF THE INVENTION

Certain design applications specify the need for a high performance motion estimator using an array of 16×16 sum of absolute difference value pixel processing elements, such that utilization is maximized for any search size.

Conventional solutions implement either a single memory or a very wide memory. With a single memory, data is stored in raster words. An array of registers is also implemented outside a PEL array to allow sequential loading of data words. The array is large enough to allow 16 words to be written when in a continuous horizontal scan. The single memory solution uses a large array of registers external to the PEL array. Such an array takes significant time to shift down to a particular row.

In a very wide memory implementation (either full row or full column), a barrel shifter selects the correct position. A $17^{th}$ row register allows a shift-down in a single cycle. The very wide memory apparatus cannot handle small searches less than the width of a macroblock, since such searches do not fill the $17^{th}$ row.

It would be desirable to implement a tiled memory array for full search motion estimation that operates with arbitrarily sized searches and does not need an array of registers external to the search array.

SUMMARY OF THE INVENTION

The present invention concerns a plurality of memory circuits and a logic circuit. The plurality of memory circuits may be configured to store a plurality of pixels. The pixels may be used in a motion estimation stage of a video encoder. The logic circuit may be configured to (i) control which of the pixels are stored in which of the plurality of memory banks and (ii) control accessing of the plurality of pixels.

The objects, features and advantages of the present invention include providing tiled memory array for implementing full search motion estimation that may (i) provide multiple memories used to store search data, (ii) provide data in memories organized so arbitrarily located directional lines segments of adjacent pixels may be accessed effectively simultaneously, and/or (iii) implement a circuit surrounding a memory to enable directional line segment access.

BRIEF DESCRIPTION OF THE DRAWINGS

These and other objects, features and advantages of the present invention will be apparent from the following detailed description and the appended claims and drawings in which:

FIG. 9 is a block diagram illustrating the coordinates of each pixel stored in each memory bank.

DETAILED DESCRIPTION OF THE PREFERRED EMBODIMENTS

Figure 1:
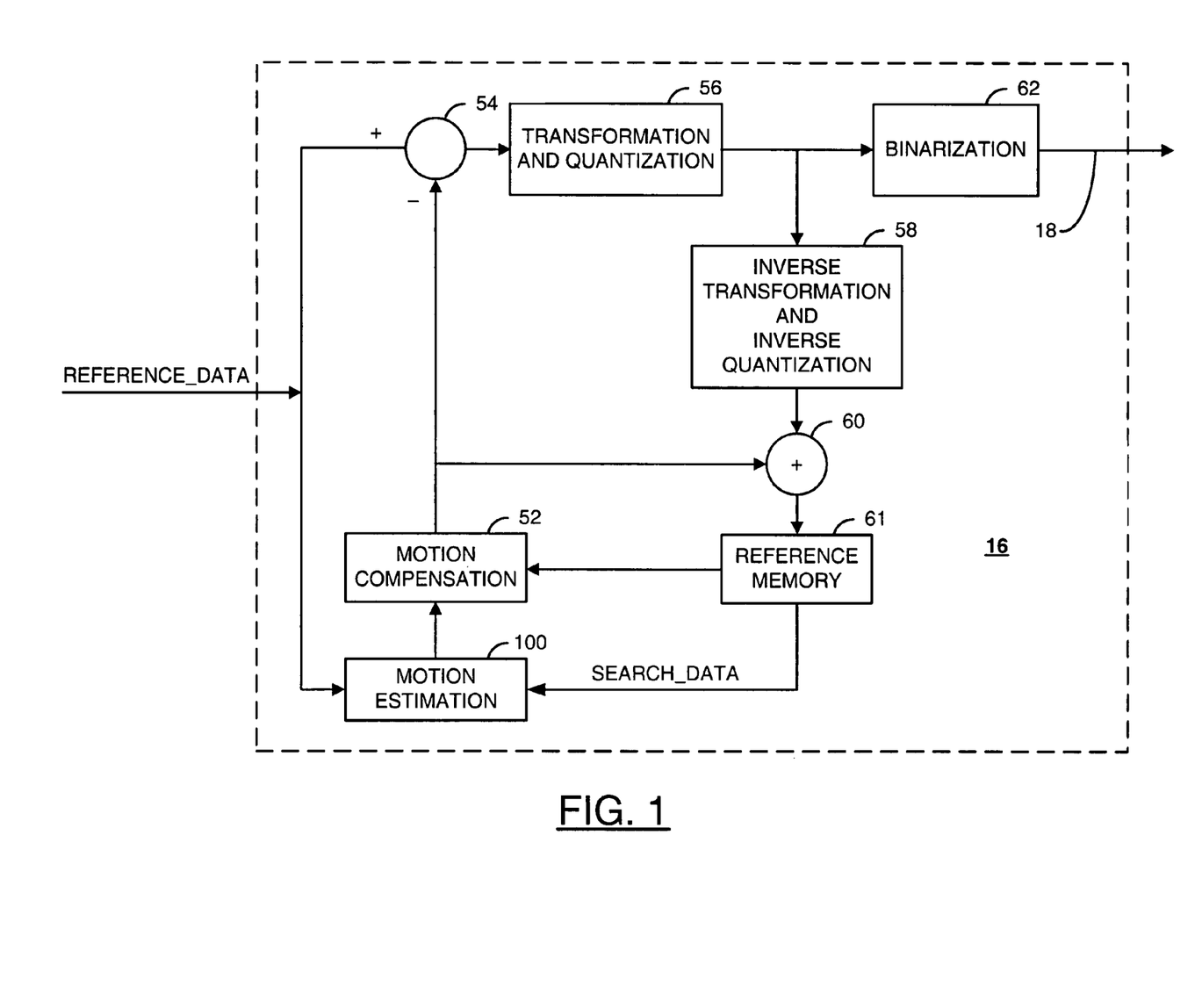
FIG. 1 is a block diagram of a video system illustrating a context of the present invention.

Referring to FIG. 1, a block diagram of an encoder 16 is shown illustrating a context for the present invention. The encoder 16 may accept a video source signal (e.g., REFERENCE_DATA) as an input signal. The signal REFERENCE_DATA may be presented to a motion estimation block (or circuit) 100 that may be used to determine motion difference between frames. Details of the motion estimation circuit 100 will be described in more detail in connection with FIG. 2. An output of motion estimation circuit 100 may be passed to a motion compensation block (or circuit) 52. A combination block (or circuit) 54 may subtract an output signal from the motion compensation module 52 from the input video source signal REFERENCE_DATA to create a signal presented to a transformation and quantization block (or circuit) 56. An output signal from motion the compensation block (or circuit) 52 may also be provided to an adder block (or circuit) 60.

The circuit 56 generally transforms and quantizes an output signal from the combination circuit 54. An output signal from the circuit 56 may be recalculated based upon prediction error formed from a loop comprising the circuits 52, 54, 56, 58, 60 and 61. An output of the circuit 56 may be presented as an input to the binarization unit 62. The output signal 18 generally comprises a compressed video bitstream for transmission or storage. The output signal from the circuit 56 may become an input signal to an inverse transformation block (or circuit) 58. The inverse transform circuit 58 generally applies an inverse transformation and an inverse quantization to the signal received from the circuit 56 and provides a resulting signal to an adder block (or circuit) 60. The adder circuit 60 may combine the inverse quantized signal with the output signal from the motion compensation circuit 52 to create a reconstructed signal. Reconstructed pictures in the reconstructed signal may be stored in a reference memory 61. The reconstructed pictures may then be used as reference pictures by the motion compensation module 52. The reference memory 61 may also present a signal (e.g., SEARCH_DATA) to the motion estimation circuit 100. The signal SEARCH_DATA may be used by the motion estimation circuit during the exceeding process.

An MPEG video transmission may be implemented as a series of pictures taken at closely spaced time intervals. In the MPEG/H.26x standards, a picture may be referred to as a "frame" or a "field" (hereafter, generically referred to as frames). For example, each picture in a video sequence may be encoded as one of two types, (i) an intra frame or (ii) an inter frame. Intra frames (e.g., I-frames) may be encoded in isolation from other frames, compressing data based on similarity within a region of a single frame. Inter frames (e.g., P-frames and B-frames) may be coded based on similarity a region of one frame and a region of a successive frames. Fields may be treated in a similar manner.

In a simplest form, an inter frame may be thought of as encoding the difference between two successive frames. Consider two frames of a video sequence showing waves washing up on a beach. The areas of the video that show the sky and the sand on the beach generally do not change, while the area of video where the waves move does change. An inter frame in the sequence may contain only the difference between two frames. As a result, only pixel information relating to the waves may be repeatedly encoded, not pixel information relating to the sky or the beach.

An inter frame may be encoded by generating a predicted value for each pixel in the frame based on pixels in previously encoded frames. The aggregation of the predicted values is usually called a predicted frame. The difference between the original frame and the predicted frame may be called a residual frame. The encoded inter frame generally contain information about how to generate the predicted frame utilizing both the previous frames and the residual frame. In the example of waves washing up on a beach, the predicted frame may be the first frame of the two frames and the residual frame may be the difference between the two frames.

In the MPEG-AVC/H.264 standard, two types of inter frames may be defined. Predictive frames (e.g., P-frames) may be encoded based on a predictive frame created from one or more frames that occur earlier in the video sequence. Bidirectional predictive frames (e.g., B-frames) are generally based on predictive frames that are generated from two frames either earlier or later in the video sequence.

Figure 2:
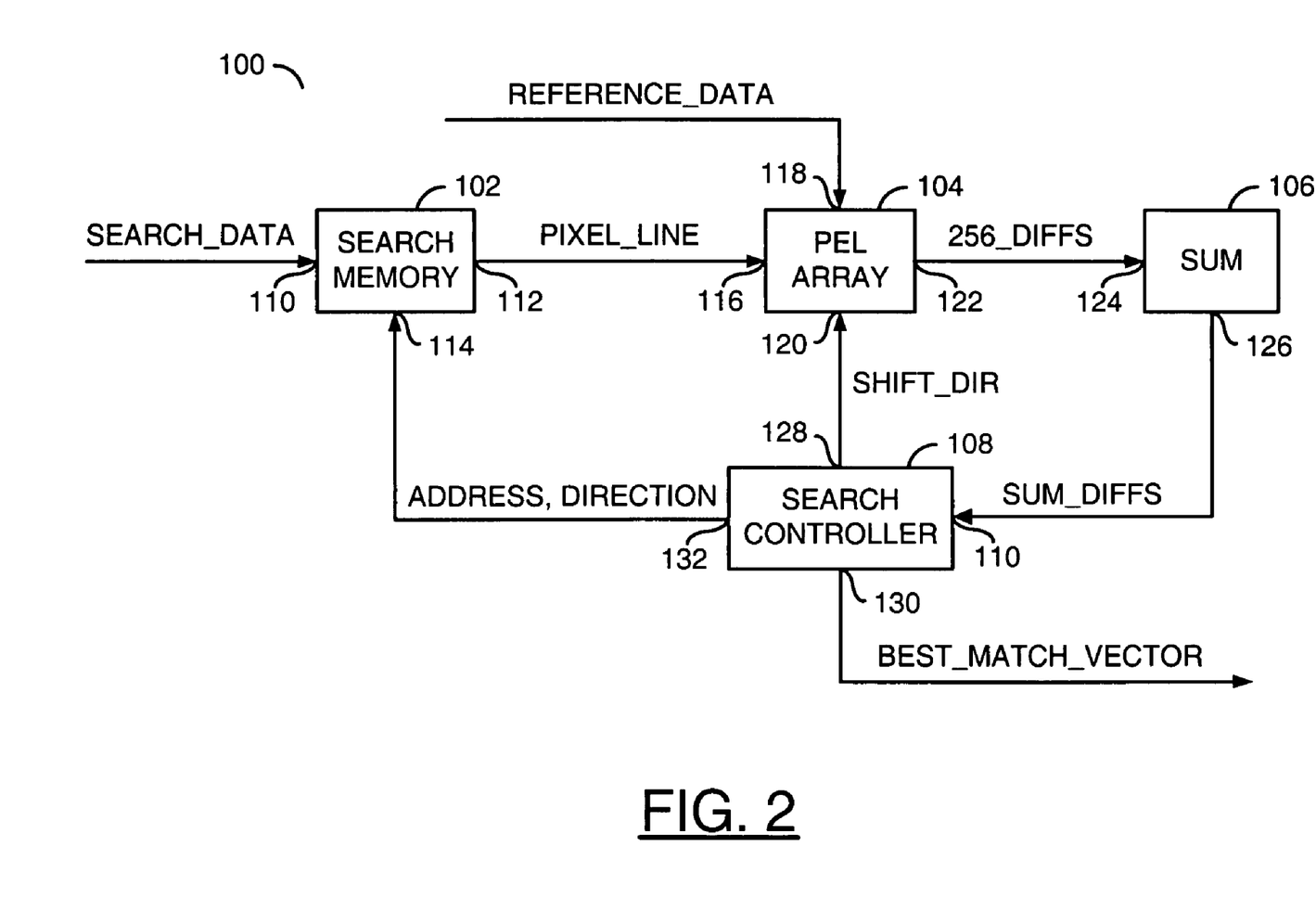
FIG. 2 is a block diagram of the present invention.

Referring to FIG. 2, a block diagram of the motion estimation block (or system) 100 is shown. The system 100 generally comprises a block (or circuit) 102, a block (or circuit) 104, a block (or circuit) 106, a block (or circuit) 108. In one example, the circuit 102 may be implemented as a search memory. The search memory 102 may be implemented as a plurality of random access memories (RAMS). In one example, the circuit 104 may be implemented as a processing element (PEL) array. In one example, the circuit 106 may be implemented as a sum circuit. In one example, the circuit 108 may be implemented as a search controller circuit. The circuit 102 may have an input 110 that may receive the signal SEARCH_DATA, an output 112 that may present a signal (e.g., PIXEL_LINE) and an input 114 that may receive one or more control signals (e.g., a signal ADDRESS, a signal DIRECTION, etc.). The circuit 104 may have an input 116 that may receive a signal (e.g., PIXEL_LINE), an input 118 that may receive the signal REFERENCE_DATA, an input 120 that may receive a signal (e.g., SHIFT_DIR) and an output 122 that may present a signal (e.g., 256_DIFFS). The circuit 106 may have an input 124 that may receive the signal 256_DIFFS, and an output 126 that may present a signal (e.g., SUM_DIFFS). The circuit 108 may have an input 110 that may receive the signal SUM_DIFFS, an output 128 that may present the signal SHIFT_DIR, an output 130 that may present a signal (e.g., BEST_MATCH_VECTOR) and an output 132 that may present the control signals ADDRESS and DIRECTION.

Figure 3:
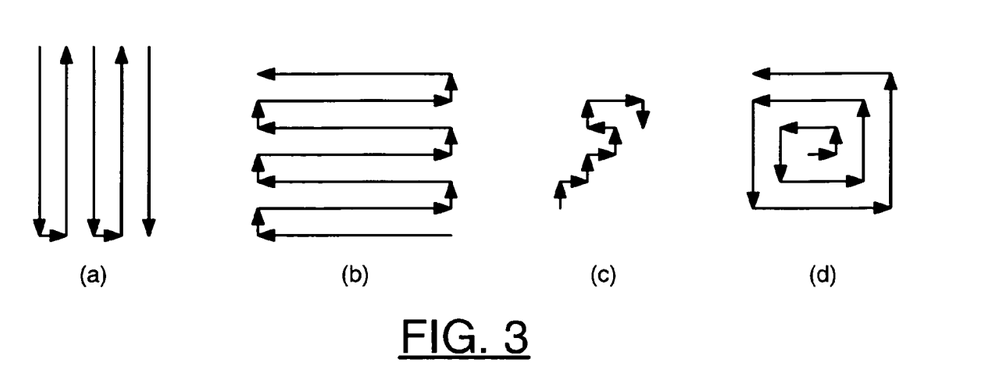
FIG. 3 is a diagram illustrating a variety of search patterns.

Referring to FIG. 3, a diagram illustrating a variety of search patterns (a)-(d) are shown. A search pattern (a) illustrates a sequence of vertical searches. A search pattern (b) illustrates a continuous horizontal search pattern. A search pattern (c) illustrates a gradient descent pattern. A search patter (d) illustrates a concentric type search pattern. The various search patterns and may cross over various banks of the memory 102.

Figure 4:
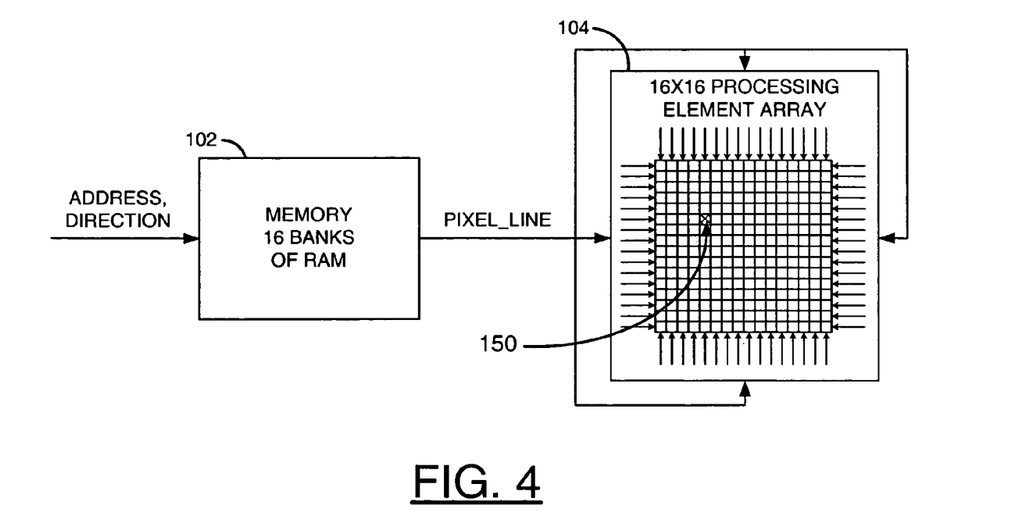
FIG. 4 is a block diagram of the search memory and the PEL array.

Referring to FIG. 4, a more detailed diagram of the search memory 102 and the PEL array 104 is shown. The memory 102 is shown implemented as 16 banks of random access memory. While 16 banks are shown, the particular number of banks may be varied to meet the design criteria of a particular implementation. The PEL array 104 is shown implemented as a 16×16 processing element array. The number of rows and columns of the PEL array 104 may or may not match the number of banks in the memory 102. An element 150 is shown illustrating an example of any one of the elements in the PEL array 104.

Figure 5:
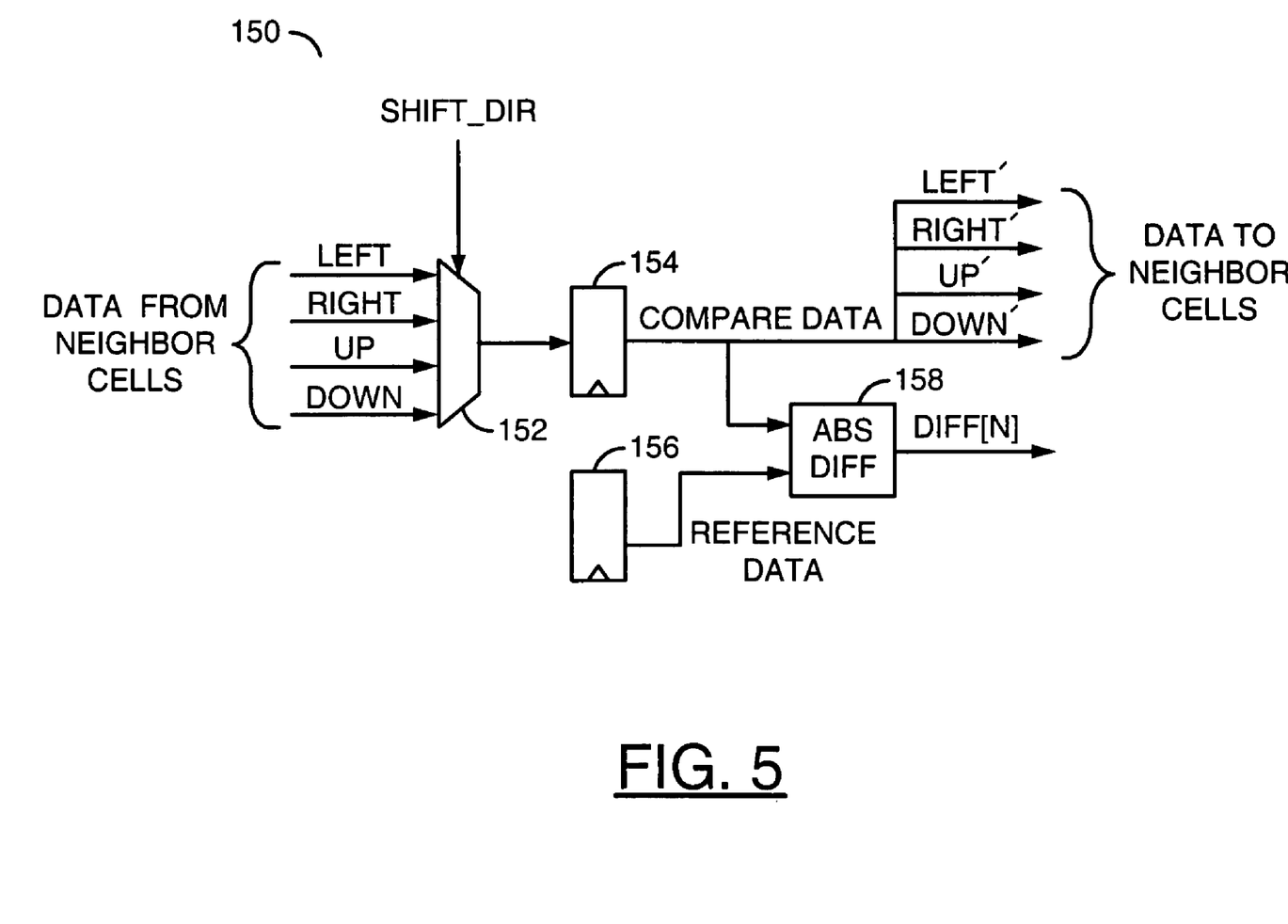
FIG. 5 is a block diagram of an element of the PEL array.

Referring to FIG. 5, a more detailed diagram of the element 150 is shown. The element 150 generally comprises a block (or circuit) 152, a block (or circuit) 154, a block (or circuit) 156, a block (or circuit) 158. The circuit 152 may receive data from the neighboring cell. The data may be received from a left cell, a right cell, a cell directly above the cell 150 or a cell directly below the cell 150. The signals LEFT, RIGHT, UP and DOWN, represent data from the neighboring cells. The signal SHIFT_DIR may be used to select which of the neighboring cells the cell 10 receives data from. If the cell 150 is located on the edge of the PEL array (e.g., either the left edge, the right edge, the top edge, or the bottom edge) data may instead arrive from the signal PIXEL_LINE. The circuit 154 and the circuit 156 may be implemented as registers that hold data in response to a clock signal (not shown). The register 154 presents a signal (e.g., COMPARE_DATA). The shift register 156 presents the signal REFERENCE_DATA. The circuit 156 presents a signal (e.g., DIFF[N]). The signal COMPARE_DATA may also be presented to the neighboring cells in the PEL array 104 as the signals LEFT', RIGHT', UP' AND DOWN'. Each of the elements within the PEL array 104 present a signal DIFF[N]. The combination of the outputs of the circuits 158 within each cell make up the signal 256_DIFFS, which is generally a multi-bit signal.

Figure 6:
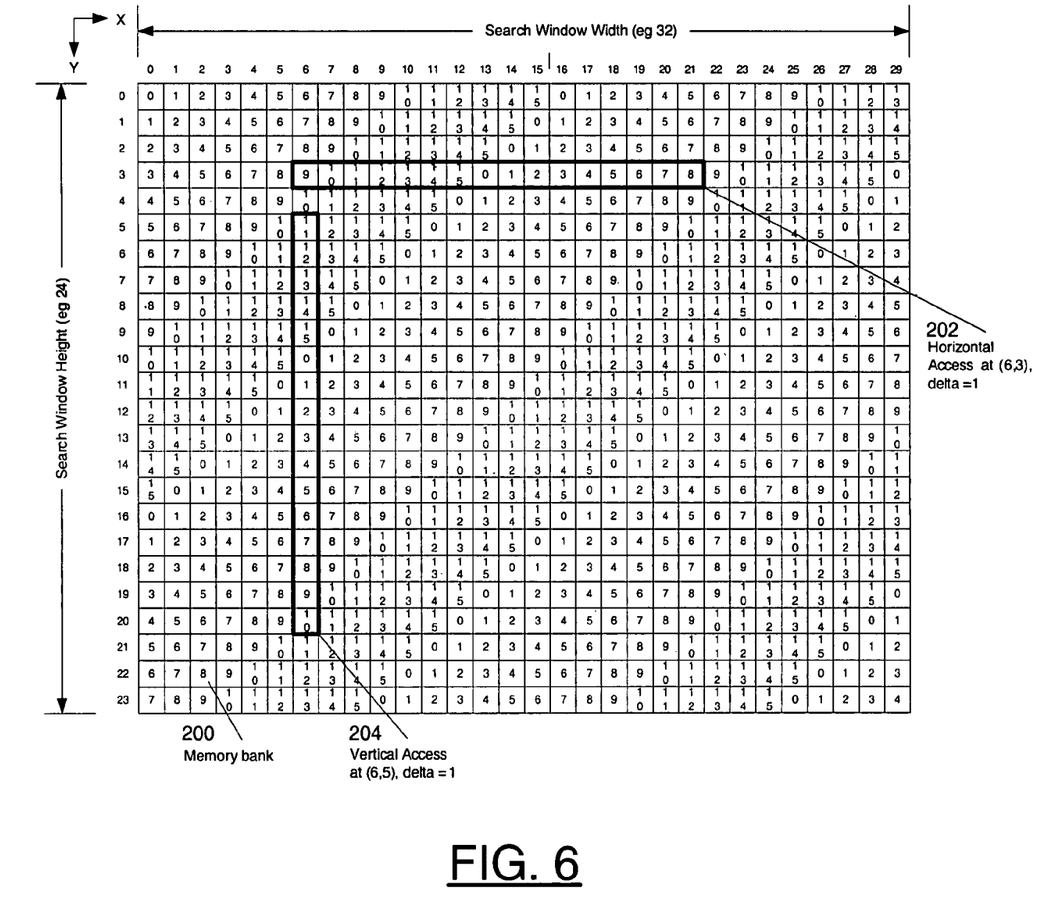
FIG. 6 is a block diagram illustrating addressing of the search memory.

Referring to FIG. 6, the diagram illustrating addressing of the search memory 102 is shown. The horizontal axis generally represents the width of a search window. In the example shown, the width is 32 pixels wide. The vertical axis shows the height of the search window. In the example shown, the search height is 24 pixels. Each of the grids is labeled to show which memory bank is being accessed. For example, a box 200 shows a pixel stored in memory bank 8, located at column 2, row 22. The box 200 represents data for a particular pixel, which is typically 8 bits. A box 202 represents a line of pixels. The box 202 starts at column 6, row 3. The first pixel of the line is stored in memory bank, the second pixel of data is stored in memory bank 10, the third pixel of data is stored in memory bank 11, etc. A second box 204 represents data for another line of pixels. The box 204 starts at column 6, row 5. The first pixel is stored in memory bank 11, the second pixel is stored in memory bank 12, etc.

Figure 7:
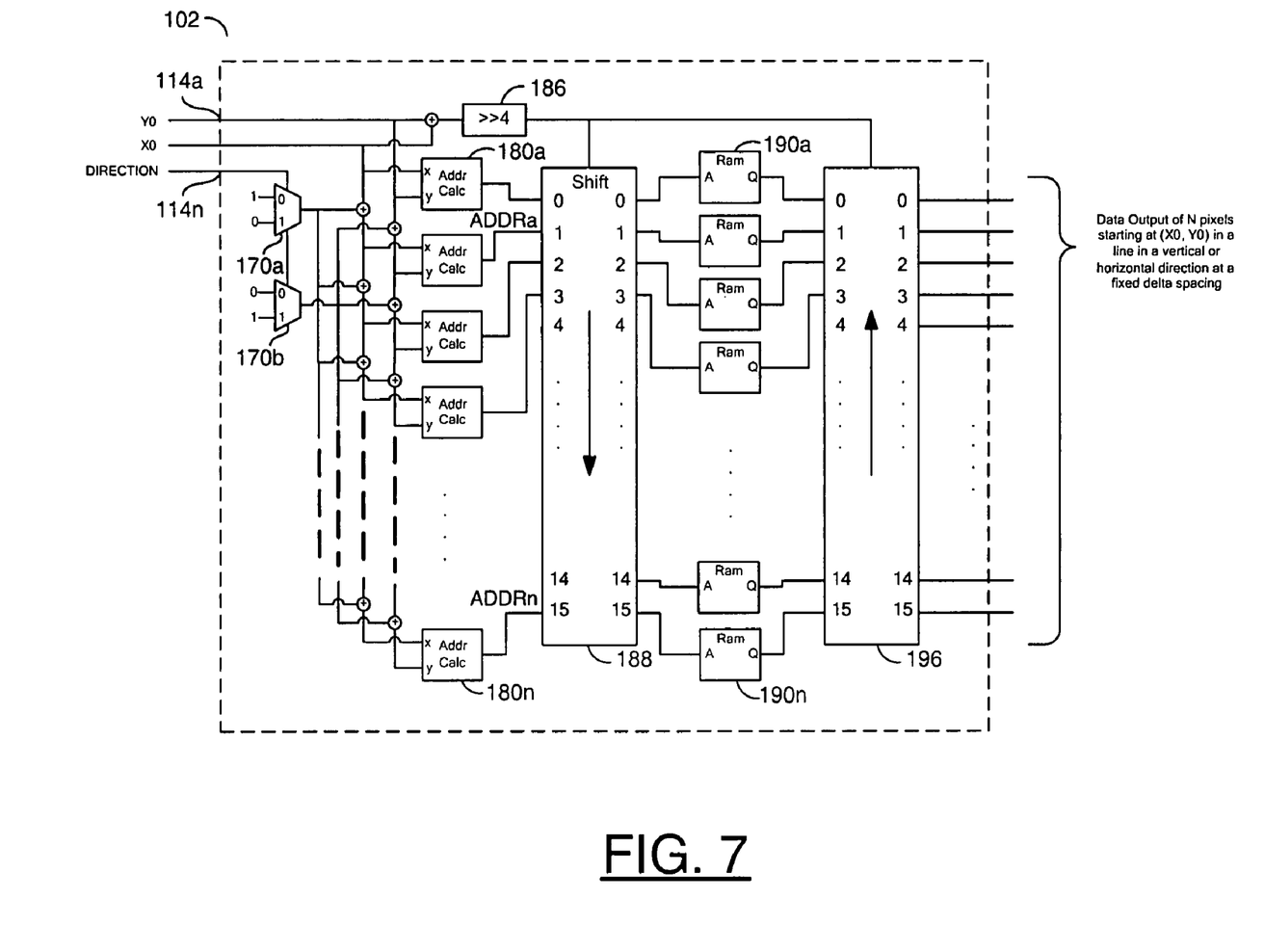
FIG. 7 is a block diagram of the search memory.

Referring to FIG. 7, a more detailed diagram of the search memory 102 is shown. The search memory 102 generally comprises a number of blocks (or circuits) 170a-170b, a number of blocks (or circuits) 180a-180n, a block (or circuit) 186, a block (or circuit) 188, a number of blocks (or circuits) 190a-190n and a block (or circuit) 196. The circuits 170a-170b may be implemented as multiplexers. In the example shown, the circuits 170a-170b are implemented as 2-input multiplexers. The signal DIRECTION may be used as a select input to the circuits 170a-170b. In general, the signal DIRECTION indicates whether a horizontal or a vertical access is needed. The signal ADDRESS from FIG. 2 is shown implemented as a signal (e.g., Y0) and a signal (e.g., X0).

The circuits 180a-180n may be implemented as address calculation circuits. The circuit 188 may be implemented as a barrel shifter. In the example shown, the barrel shifter 188 may be implemented as a 16-input and 16-output shifter. The circuits 180a-108n may be used to generate address signals (e.g., ADDRa-ADDRn) that may be presented to the circuit 188. The address signals ADDRa-ADDRn may be generated in response to signals received from the circuits 170a-170n, the signal Y0 and the signal X0. The circuit 186 may be implemented as a right shift circuit that may effectively divide the signal Y0 by $2^4$ (16). If so, the circuit 186 normally controls a shift input of the circuit 188 and the circuit 196. The circuits 190a-190n may be implemented as the memory banks.

Figure 8:
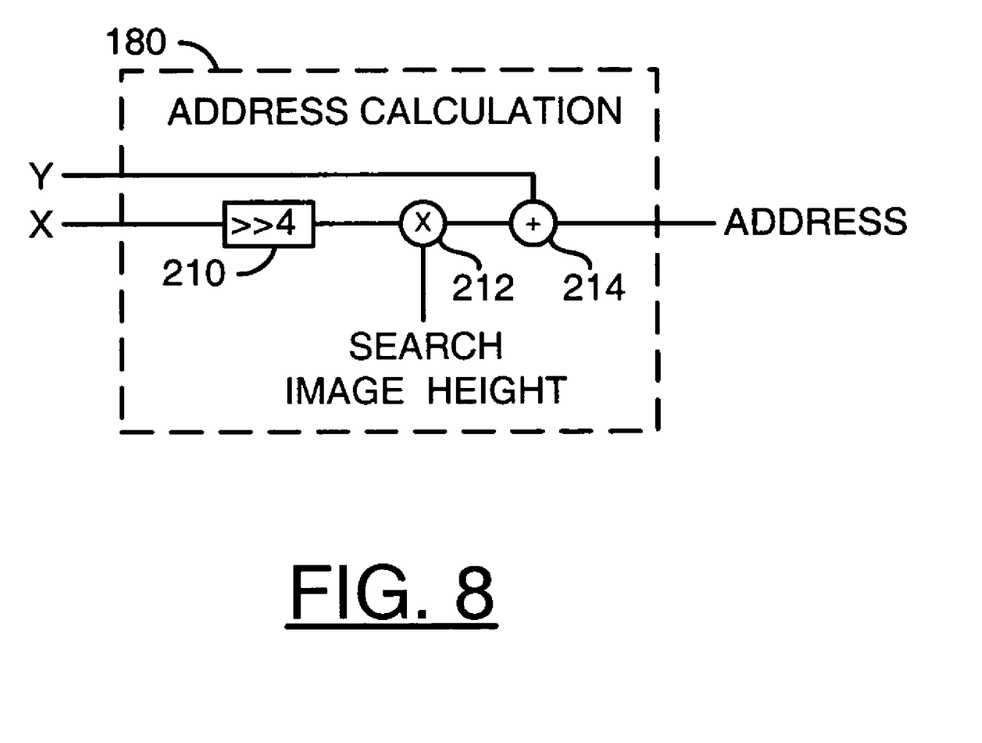
FIG. 8 is a block diagram of the address calculation circuit.

Referring to FIG. 8, a more detailed diagram of one of the address calculation circuits 180 is shown. The circuit 180 generally comprises a block (or circuit) 210, a block (or circuit) 212, and a block (or circuit) 214. The circuit 210 may divide the signal X by 16 (by shifting the signal X to the right 4 binary digits). The circuit 212 may multiply the signal X by a signal (e.g., SEARCH_IMAGE_HEIGHT). The circuit 214 may add the output of the circuit 212 to the signal Y to generate the signal ADDRESS.

Referring to FIG. 9, a table is shown illustrating the coordinates of each particular pixel stored in each memory bank. The number of memory banks RAM0-RAM15 are shown. A number of rows 0-47 are also shown.

The search memory 102 may simultaneously calculate the addresses ADDRa-ADDRn for each of the memory banks 190a-190n. The search memory 62 may generate the addresses ADDRa-ADDRn in response to a given vector (e.g., origin, direction), and a tiling of an array of pixels, of search data. The search memory 62 may read the memory banks 190a-190n and forward data to the pel array 104. The pel array 104 may then shift the data from an edge of the array to allow searching of a given location. A series of such accesses, coupled with a programmable shift direction of the pel array 104 may allow efficient and flexible full search motion estimation.

The motion estimation circuit (or engine) 100 is normally loaded with data from the signal REFERENCE_DATA. The data from the signal REFERENCE_DATA is usually a 16×16 array of pixels. The search data may be in the form of an array larger than 16×16. The present invention may be used to find the best match between the two. A sum of absolute differences may be used to rank the match, although other configurations may be implemented (e.g., a sum of squared distance, etc.)

The signal SEARCH_DATA is normally loaded into the search memory 102. The search memory 102 may be implemented as the memory banks 190a-190n. The data may be tiled over the memory banks 190a-190n. The tiling may be implemented such that any row or column of 16 adjacent pixels is normally accessible at the same time. The circuit 180 accesses the row or column of data in response to the signals X, Y, and DIRECTION logical address. A number of circuits 180a-180n generate the address signals ADDRa-ADDRn. The logical addresses ADDRa-ADDRn are then put through the address translation of FIG. 9 to calculate the ram addresses. The addresses are then shifted to address the appropriate ram 190a-190n. The resulting data is shifted back to the correct order.

With a general access of 16 pixels horizontally (or vertically) arranged, the motion estimation circuit 100 may allow any type of search with full utilization during the search. The estimation portion of the search may be implemented with the array of processing units of FIG. 6, which calculates the absolute difference between one reference data pixel and a candidate search pixel. The signal SEARCH_DATA may then be shifted within the PEL array 104, and externally in on one edge in multiple directions (e.g., 3 or more). The entire 16×16 array of processing units may have 3 or more edges to shift in data. These input buses are all driven by the output of the search memory unit 150.

For each search location, the array of 256 differences are normally summed. In certain applications, other operations, such as a hadamard transform, may occur before the summing. The signal SUM_DIFFS may then be fed back to the search controller 108, which may keep track of the search location with the lowest difference. The signal SUM_DIFFS may also be used to guide the search, such as with a 2 step, or gradient descent.

The present invention may implement a tiled memory array for full search motion estimation that may be implemented without an array of registers, external to the search array. A variety of sizes of searches may be performed without reload penalties.

A variety of different search metrics may be implemented. For example, instead of performing a sum of absolute differences, a sum of squared differences, a sum of absolute differences of transformed differences, or other summing may be performed.

The present invention may also have non-video compression applications. For example, the present invention may be implemented on a press registration for print inspection, scene analysis and object tracking, counterfeit detection, etc.

A variety of sizes of memory tilings may be formulated, so long as the basic property holds that a horizontal or vertical stripe are accessed in a single cycle. The same data may be used to send data into a sub pel search array 104 following the full pel best results. The scheme may be extended to support non-adjacent pixels for hierarchical searches.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a plurality of memory circuits configured to store a plurality of pixels used in a motion estimation stage of a video encoder, wherein said plurality of memory circuits comprise a search memory;
   a plurality of address calculation circuits configured to control addressing to said plurality of memory circuits; and
   a logic circuit configured to (i) control which of said pixels are stored in which of said plurality of memory circuits and (ii) control accessing of said plurality of pixels, wherein (a) said logic circuit controls access to said plurality of memory circuits in response to an address signal and a directional signal received from a search controller circuit, (b) said directional signal selects a first search direction for accessing said plurality of pixels in said plurality of memory circuits to the (A) right, (B) left, (C) above, or (D) below a current pixel, (c) said directional signal selects a second search direction for accessing said plurality of pixels in said plurality of memory circuits to the (A) right, (B) left, (C) above, or (D) below said current pixel, (d) said first search direction is different from said second search direction, and (e) said second search direction is selected after completion of accessing said plurality of pixels in said first search direction.

2. The apparatus according to claim 1, wherein said logic circuit further comprises:
- a first shift circuit configured to shift data from said plurality of memory circuits; and
- a second shift circuit configured to shift data to said plurality of memory circuits.

3. The apparatus according to claim 1, wherein said pixels stored in said plurality of memory circuits presented to a motion estimation processing element array.

4. The apparatus according to claim 1, wherein each of said plurality of memory circuits comprises a bank of random access memory (RAM).

5. The apparatus according to claim 2, wherein said pixels are stored in said plurality of memory circuits in a pattern that allows simultaneous access to each of said pixels.

6. The apparatus according to claim 1, wherein said pixels are stored and accessed in groups of line segments comprising a plurality of said pixels.

7. The apparatus according to claim 6, wherein said apparatus allows directional access to said line segments, in response to a said direction signal from said logic circuit.

8. The apparatus according to claim 6, wherein said apparatus stores a plurality of said line segments that are accessed in one of a plurality of search patterns.

9. An apparatus comprising:
- means for storing a plurality of pixels in a plurality of memory banks, wherein said pixels are used in a motion estimation stage of a video encoder, wherein said plurality of memory banks comprise a search memory; and
- means for calculation of address locations to control addressing to said plurality of memory banks; and
- means for controlling which of said pixels are stored in which of said plurality of memory banks with a logic circuit; and
- means for accessing said plurality of pixels in response to said logic circuit, wherein (a) said logic circuit controls access to said plurality of memory banks in response to an address signal and a directional signal received from a search controller circuit, (b) said directional signal selects a first search direction for accessing said plurality of pixels in said plurality of memory banks to the (A) right, (B) left, (C) above, or (D) below a current pixel, (c) said directional signal selects a second search direction for accessing said plurality of pixels in said plurality of memory banks to the (A) right, (B) left, (C) above, or (D) below said current pixel, (d) said first search direction is different from said second search direction, and (e) said second search direction is selected after completion of accessing said plurality of pixels in said first search direction.

10. A method for storing search data, comprising the steps of:
- (A) storing a plurality of pixels in a plurality of memory banks, wherein said pixels are used in a motion estimation stage of a video encoder, wherein said plurality of memory banks comprise a search memory;
- (B) calculating addresses to said plurality of memory banks using a plurality of address calculation circuits; and
- (C) controlling which of said pixels are stored in which of said plurality of memory banks with a logic circuit; and
- (D) accessing said plurality of pixels in response to said logic circuit, wherein (i) said logic circuit controls access to said plurality of memory banks in response to an address signal and a directional signal received from a search controller circuit, (ii) said directional signal selects a first search direction for accessing said plurality of pixels in said plurality of memory banks to the (a) right, (b) left, (c) above, or (d) below a current pixel, (iii) said directional signal selects a second search direction for accessing said plurality of pixels in said plurality of memory banks to the (a) right, (b) left, (c) above, or (d) below said current pixel, (iv) said first search direction is different from said second search direction, and (v) said second search direction is selected after completion of accessing said plurality of pixels in said first search direction.

11. The method according to claim 10, wherein said logic circuit further comprises:
- a first shift circuit configured to shift data from said plurality of memory banks; and
- a second shift circuit configured to shift data to said plurality of memory banks.

12. The method according to claim 10, wherein said pixels stored in said plurality of memory banks presented to a motion estimation processing element array.

13. The method according to claim 10, wherein said pixels are stored and accessed in groups of line segments comprising a plurality of said pixels.

14. The method according to claim 13, wherein said method allows directional access to said line segments, in response to a direction signal from said logic circuit.

15. The method according to claim 13, wherein said method stores a plurality of said line segments that are accessed in one of a plurality of search patterns.

* * * * *